(12) United States Patent
Moulon et al.

(10) Patent No.: US 8,702,034 B2
(45) Date of Patent: Apr. 22, 2014

(54) TEST DEVICE FOR THE DETECTION OF THE RECOVERY EFFORT BY A SECONDARY FLIGHT ORDERING ACTUATOR, AND ASSOCIATED TEST METHOD

(75) Inventors: Thomas Moulon, Ermont (FR); Pierre Turpin, Maurepas (FR)

(73) Assignee: Goodrich Actuation Systems SAS (FR)

( * ) Notice: Subject to any disclaimer, the term of this patent is extended or adjusted under 35 U.S.C. 154(b) by 470 days.

(21) Appl. No.: 12/962,883

(22) Filed: Dec. 8, 2010

(65) Prior Publication Data

US 2011/0132106 A1 Jun. 9, 2011

(30) Foreign Application Priority Data

Dec. 8, 2009 (FR) ...................................... 09 58738

(51) Int. Cl.
*B64C 3/38* (2006.01)
*B64C 5/10* (2006.01)
*B64C 9/00* (2006.01)
*B64C 13/00* (2006.01)

(52) U.S. Cl.
USPC .... 244/99.2; 244/99.3; 244/99.4; 73/862.381

(58) Field of Classification Search
USPC ............................. 73/862.381; 244/99.2–99.4
See application file for complete search history.

(56) References Cited

U.S. PATENT DOCUMENTS

| | | | |
|---|---|---|---|
| 5,628,477 A * | 5/1997 | Caferro et al. ................. | 244/214 |
| 6,389,915 B1 * | 5/2002 | Wngett ......................... | 74/89.23 |
| 6,578,425 B2 | 6/2003 | Hickman | |
| 6,659,399 B1 * | 12/2003 | Bagnoli et al. ................ | 244/99.4 |
| 6,672,540 B1 * | 1/2004 | Shaheen et al. ............... | 244/99.3 |
| 6,704,624 B2 * | 3/2004 | Ortega et al. ...................... | 701/3 |
| 6,851,648 B2 * | 2/2005 | Perni et al. .................... | 244/99.3 |
| 7,686,680 B2 | 3/2010 | Horner | |
| 7,866,602 B2 * | 1/2011 | Port-Robach et al. ....... | 244/99.4 |
| 7,946,529 B2 * | 5/2011 | Moalic et al. ................. | 244/99.4 |
| 8,052,084 B2 * | 11/2011 | Port-Robach et al. ....... | 244/99.3 |
| 2007/0018040 A1 * | 1/2007 | Wingett et al. .............. | 244/99.4 |
| 2008/0116317 A1 * | 5/2008 | Steinberg ...................... | 244/99.3 |
| 2008/0249670 A1 | 10/2008 | Seren | |
| 2008/0315040 A1 * | 12/2008 | Moalic et al. ................. | 244/220 |
| 2010/0001125 A1 * | 1/2010 | Cavalier et al. .............. | 244/99.3 |
| 2011/0132106 A1 * | 6/2011 | Moulon et al. ........... | 73/862.381 |

FOREIGN PATENT DOCUMENTS

GB 749253 A 5/1956

* cited by examiner

*Primary Examiner* — Lisa Caputo
*Assistant Examiner* — Jonathan Dunlap
(74) *Attorney, Agent, or Firm* — Cantor Colburn LLP

(57) ABSTRACT

The disclosure relates to a device for testing means of detecting the loading of the secondary path of a flight control actuator of the type including a primary path and a secondary path able to take up the effort of the primary path in the event of a breakdown of the latter, wherein a tool is able to press against at least one zone of at least one element of the secondary path, as well as a lever arm which by tilting allows the tool to press against the zone so that it exerts a traction and/or compression force on the secondary path, the lever arm being mounted pivotingly on a support able to be fastened on a structure that is mechanically independent of the secondary path.

20 Claims, 7 Drawing Sheets

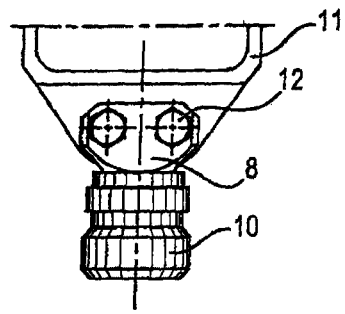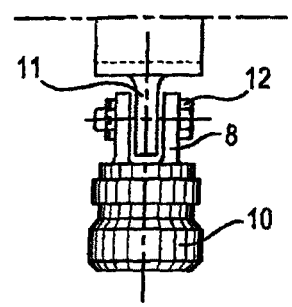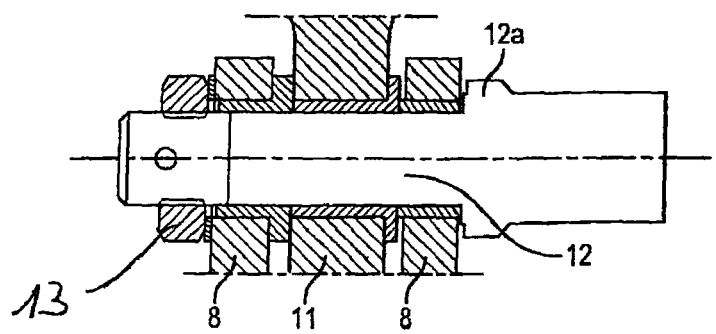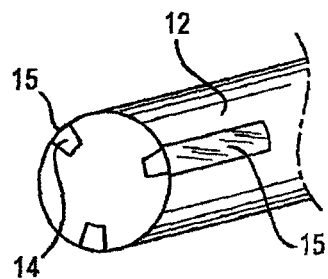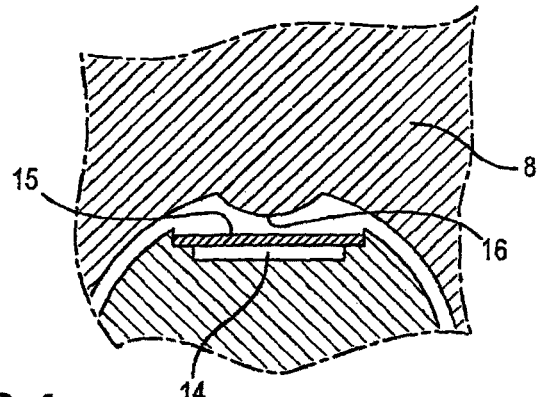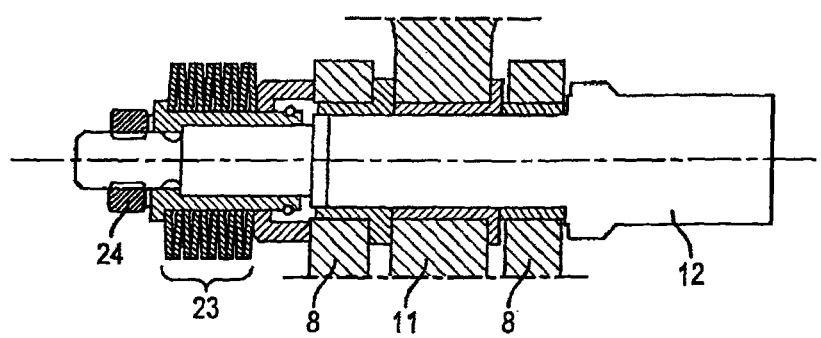

TEST DEVICE FOR THE DETECTION OF THE RECOVERY EFFORT BY A SECONDARY FLIGHT ORDERING ACTUATOR, AND ASSOCIATED TEST METHOD

CROSS-REFERENCE TO RELATED APPLICATIONS

This application claims the benefit and priority of French Patent Application Serial No. 0958738, filed on Dec. 8, 2009, which is incorporated by reference herein.

BACKGROUND

This invention relates to a device for testing the detection of load on a flight control actuator. It also relates to a method for testing. In particular, but not in a limiting manner, it relates to testing the detection of the take-up of effort by a secondary path of a flight control actuator of aircraft and in particular advantageously has application in the case of an actuator of the THSA type (Trimmable Horizontal Stabilizer Actuator).

It is known conventionally, that such actuators comprise two mechanical paths, one primary and the other secondary, with the latter intended to take up the effort when the primary path has broken down. When operating on the primary path, the loads transit through a hollow ball or roller screw. This characteristic makes it possible to house therein a safety rod (so-called "fail safe" bar), grooved at its ends and connected with an allowance to the screw. This structure ensures the continuity of the transmission of the efforts and of the rotation of the whole (avoiding an axial separation of the elements of the screw, in the event of a rupture of the screw itself). The screw is terminated at one of its ends with a fastening piece through which it is connected to the aircraft (primary top fastener). In the event of a breakdown of the latter, the effort is recovered by the safety rod of which the end is of male shape (for example a sphere) arranged in a female shape of a fastening piece of the secondary path (secondary top fastener). This secondary top fastener is itself connected to the aircraft by means of a fastening piece of the aircraft different from that used to support the primary path.

In normal operation, when the primary path carries the effort, an allowance exists between the male shape which terminates the safety rod and the female shape of the fastening piece of the secondary path, in such a way that the secondary fastening piece of the airplane does not support any effort other than the weight of the secondary female fastening piece of the THSA. During a breakdown of the primary path, the male shape which terminates the screw comes into contact with the female shape of the fastening piece of the secondary path which results in the take-up of effort by the secondary fastening frame of the airplane.

There are diverse devices for detecting efforts integrated into the flight control actuator making it possible to detect the take-up of effort of the secondary path. An example of a solution in these terms has for example been disclosed by the applicant in application EP 08102826.8.

Nevertheless, to date there is no simple solution making it possible to test on the ground the operation of such devices for detecting the take-up of effort by a secondary path of a flight control actuator. That is why it is desired to be able to propose solutions making it possible to test such devices, in particular during the periodical inspection of the airplane on the ground. It is also desirable to have testing solutions that can be easily set up on an airplane on the ground.

SUMMARY

The invention proposes a device for testing means of detecting the loading of the secondary path of a flight control actuator of the type comprising a primary path and a secondary path able to take up the effort of the primary path in the event of a breakdown of the latter, characterised in that it comprises a tool able to press against at least one zone of at least one element of the secondary path, as well as a lever arm which by tilting allows the tool to press against said zone so that it exerts a traction and/or compression force on the secondary path, said lever arm being mounted pivotingly on a support able to be fastened on a structure that is mechanically independent of the secondary path. The invention further includes a method for testing.

An advantage of the invention is to propose a simple solution making it possible to test on the ground the operation of a device for detecting the take-up of effort by a secondary path of a flight control actuator, for reasons of maintenance of the airplane in particular. Another advantage of the invention is to propose a solution which is adapted directly on the airplane, in order to facilitate the verification and maintenance operations. Yet another advantage of the invention is to propose a test solution which is adapted directly on the airplane simply and with little invasion. Yet another advantage of the invention is to be able to propose a testing solution which results in the least malfunctions possible in the case where the test procedure is conducted with errors and/or forgotten items, and this in order to guarantee maximum safety.

BRIEF DESCRIPTION OF THE DRAWINGS

Other characteristics and advantages of the invention shall appear in the description which follows, which is purely for the purposes of illustration and in no way limiting, and must be examined with regards to the annexed drawings wherein:

FIGS. 2a to 2c are diagrammatical representations of a side view and as a cross-section showing the fastening of the top fastener of the secondary path;

FIGS. 3a and 3b show an example of the embodiment of means for detecting;

FIG. 4 is a cross-section of a screw making it possible to fasten the top fastener of the secondary path;

DETAILED DESCRIPTION

General Structure of the Actuator

Figure 1:
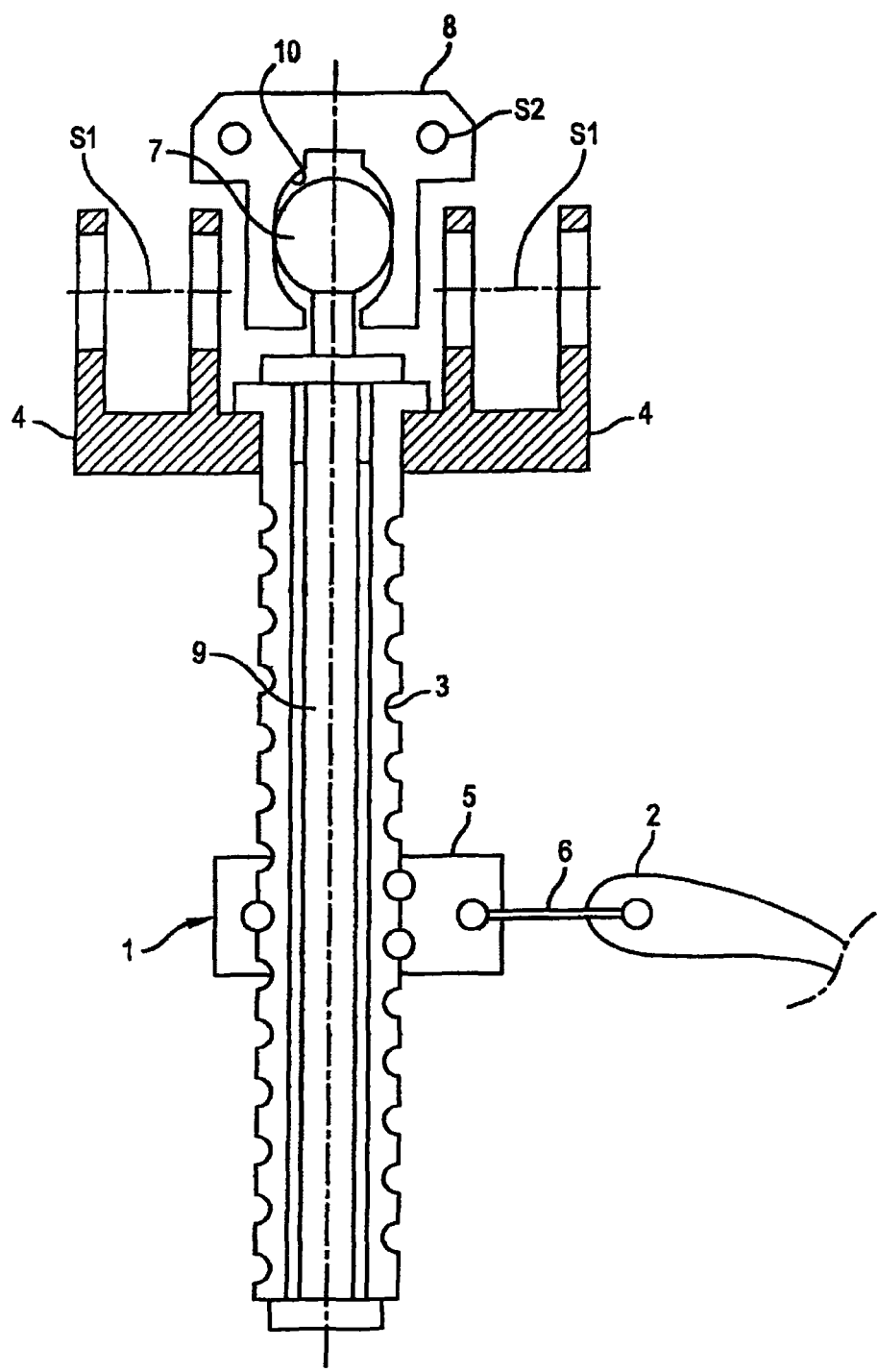
FIG. 1 is a diagrammatical representation showing the principle of a flight control actuator.

FIG. 1 diagrammatically shows a flight control actuator 1 with a primary path and a secondary path. This actuator 1 is for example a cylinder of the THSA type, to control a trimmable horizontal stabiliser 2 of the aircraft. It comprises a primary path which comprises a hollow screw 3 connected to an end, by a cardan joint system 4, to the structure 81 of the airplane. The primary path further comprises a nut 5, which cooperates with the screw 3 by being mounted on the latter and which is connected to the stabiliser 2 to be controlled, for example by another cardan joint system 6.

A safety rod 9 extends inside the hollow screw 3. This rod 9 is terminated by a spherical head 7 placed with allowance inside a female spherical shape 10 of a fastening piece 8 of the secondary path, this fastening piece 8 being itself fastened to a structure S2 of the airplane. This actuator is for example controlled by a hydraulic or electric motor M, which drives the screw 3 in rotation and displaces the nut 5 in translation, the latter being to this effect locked in rotation. The displacement in translation of the nut 5 thus makes it possible to control the tilting that is to be given to the horizontal variable stabiliser 2.

FIGS. 2*a*, 2*b* and 2*c* show the fastening of the fastening piece 8 of the secondary path on an upper fastening frame 11 of the structure S2 of the airplane. As can be seen in these figures, the piece 8 is a yoke joint which comprises two frames between which the frame 11 is received. Two parallel fastening screws 12 extend through the frames of the piece 8 and the piece 11, with the whole being fastened via clamping between heads 12*a* which terminate the fixation screws 12 at one end and nuts 13 of which the threading cooperates with that of the fastening screws 12 at their other ends.

In this embodiment, the female shape 10 is made by a piece that is separate from the fastening piece 8, this fastener piece 8 being placed on the piece which constitutes said female shape 10. Top fastener of the secondary path designates the assembly consisting in the pieces 8, 10, 11 and 12.

Detection of the Loading

Means 20 for detecting efforts are arranged in such a way as to be able to detect the loading of the top fastener of the secondary path. Means for detecting, able to detect an effort are arranged on at least one of the screws 12, or on at least one of the two frames of the piece 8, or on rings interposed between the screw 12 and the frames and/or the nut 13. More generally, these means for detecting can be arranged on any piece participating in the top fastener of the secondary path.

Several solutions of means for detecting of this type have in particular been proposed by the applicant, as for example in application EP 08102826.8. These solutions are for example with stress gauges and punches, or encore with piezoelectric blades intended to excite the screw 12 around its resonance frequency or frequencies, or with a pressure sensor ring, for example of the silicon bridge type.

FIGS. 3*a* and 3*b* show an example with strain gauge blades wherein one of the screws 12 has, perpendicular to one of the frames of the fastening piece, hollow grooves 14 whereon extend flexible strain gauge blades 15. The strain gauge blades 15 are for example distributed at 120 degrees from each other. Punches 16 protruding on the frame come to press against the strain gauge blades and deform them when the pieces of the secondary path are loaded, either in traction, or in compression. These means for detecting effort 20 are for example connected to the computer of the aircraft, which processes the measurements taken by said means in order to deduce a loading of the secondary path and trigger where applicable the corresponding alarms.

FIG. 4 shows another example wherein a spring box 23 is interposed advantageously between the nut 13 associated to the fixation screw 12 and the frame of the piece 8 that it comes to clamp. This spring box 23 makes it possible to distribute the clamping effort and makes the loading of the gauges independent of the torque clamping effort applied to the screw during assembly. False detections due to the assembly conditions are as such avoided.

Device for Testing

Figure 5:
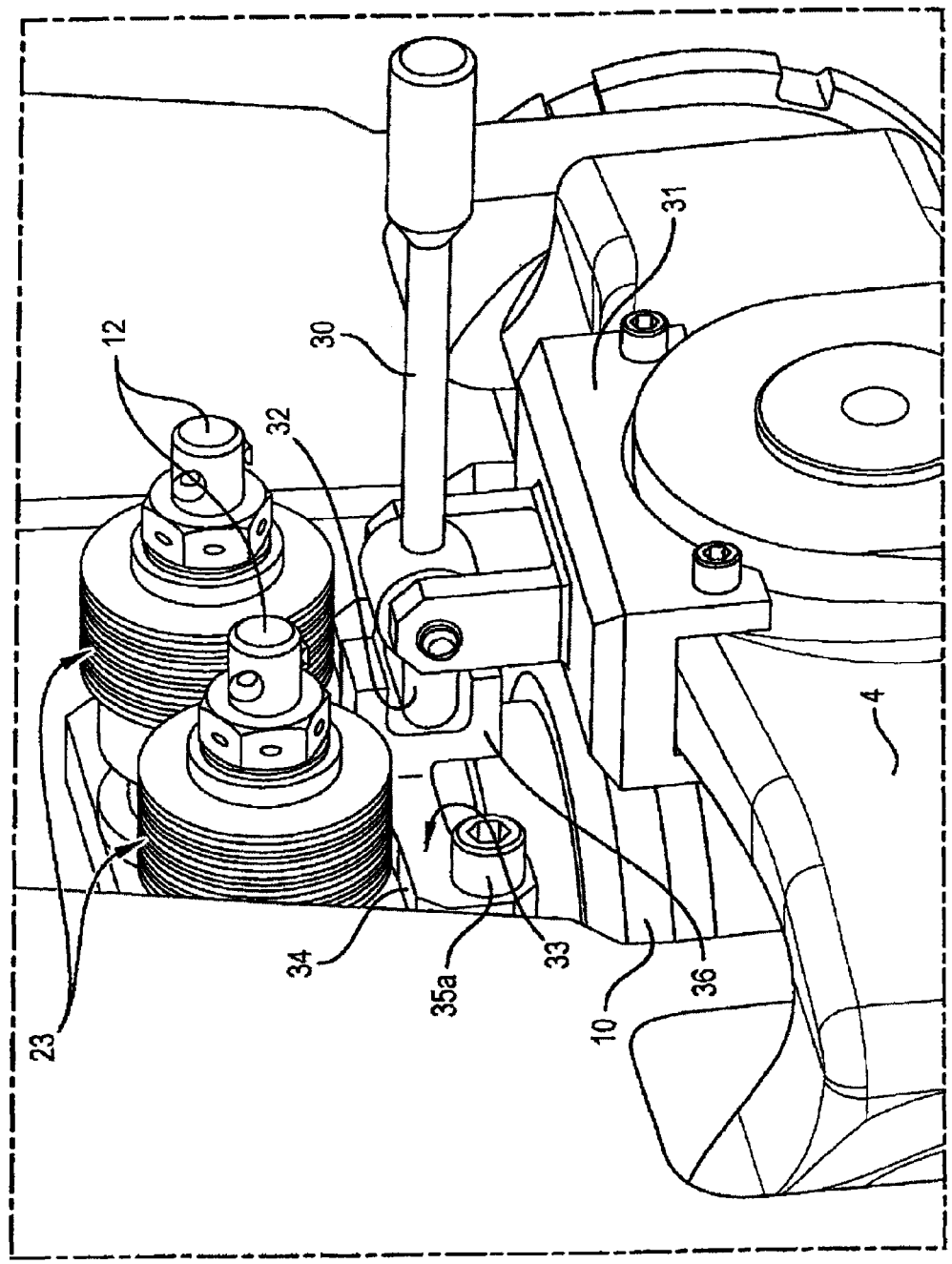
FIGS. 5 and 6 are representations in perspective of the device for testing the detection of the take-up of effort by a secondary path of a flight control actuator, set up on an aircraft.
Figure 6:
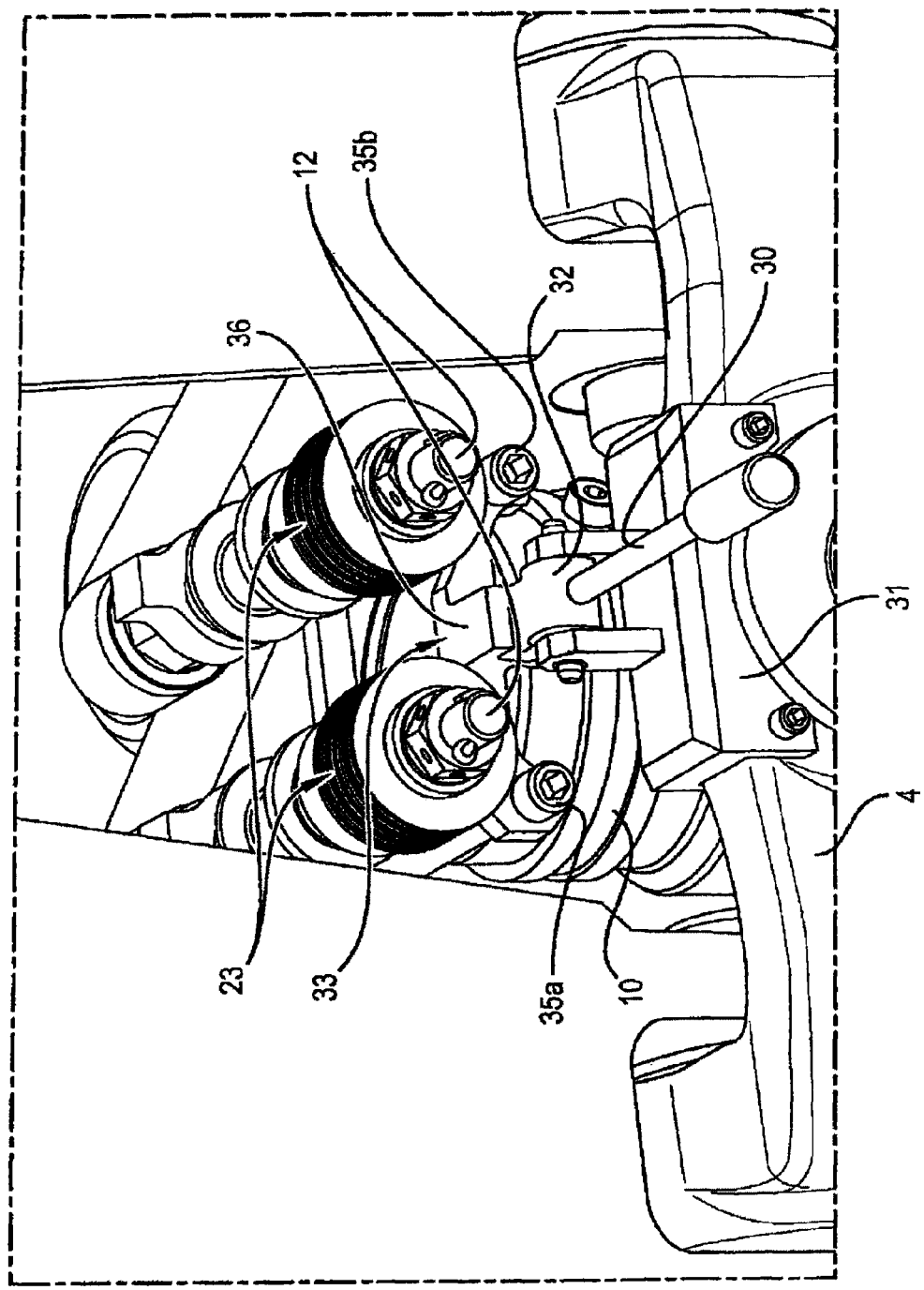
Figure 7:
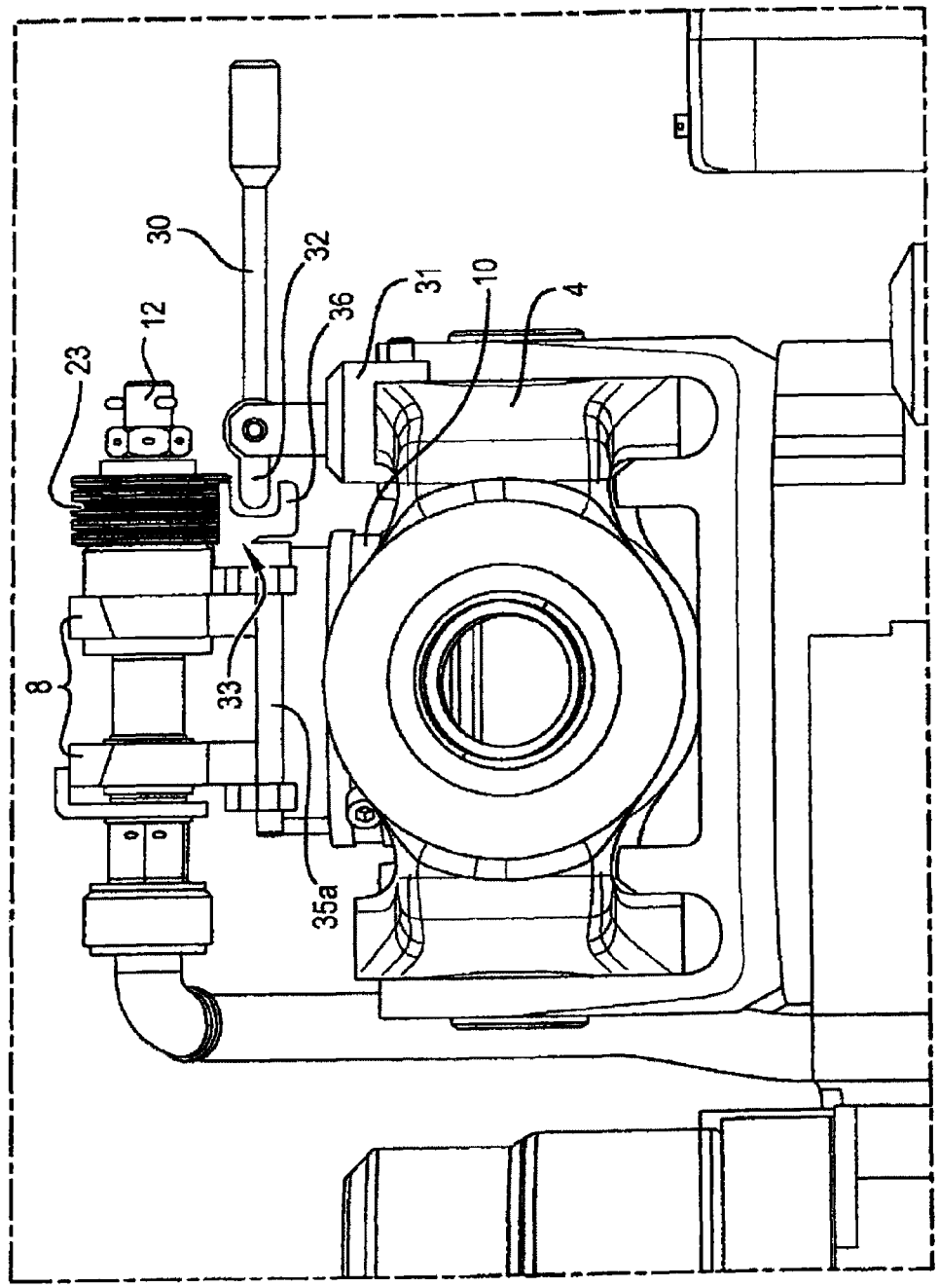
FIG. 7 is a lateral view of the device of FIGS. 5 and 6.

The device for testing shown in FIGS. 5 to 7 includes a lever arm 30 mounted pivotingly on a support 31. At its end opposite its grasping portion, the piece forming a lever arm 30 is terminated by a stop 32 intended to cooperate with a complementary U-shaped element 36, belonging to a tool 33, said stop 32 coming to press against the inside flanks of the U-shaped element wherein it is received when the lever arm is tilted in one direction or the other.

The support 31 can be an added vice, for example screwed, on a mechanically uncoupled structure in relation to the secondary path, here on the cardan joint system 4 of the primary path. Other embodiments can of course be considered. The support 31 could in particular press against a piece of the primary path or on the structure of the airplane itself.

The tool 33 clamps at least one element of the top fastener of the secondary path in such a way that it makes it possible to exert on said top fastener, by tilting of the lever arm 30 and transmission of a load by pressing against the stop 32 on the inside flanks of the U-shaped element 36, either a traction load, or a compression load, or even, as in the case which is provided as an example here, a traction load or a compression load according to the direction of tipping of the lever arm 30.

This clamping tool 33 is here carried out by the assembly of two front and rear plates 34, by means of two clamping screws 35*a* and 35*b*, which are positioned in a reduced space between an edge of the piece 8 and an edge that has, perpendicular to this edge, the piece that forms the female shape 10. In this way, there is a tool 33 which clamps the piece 8 and is able to press against either the edge of the piece 8 or against the edge of the piece 10, in such a way that a tipping movement of the lever arm 30 generates, according to the direction of this tipping movement, a traction or a compression on the secondary path.

Other configurations may be considered. For example, the clamping tool 33 may press against only the top portion of the piece 8 and allow only to exert a compression load.

The tool 33 is able to press against at least one zone of at least one element of the secondary path. Advantageously, the tool 33, comprising in particular the front and rear plates 34 connected by the clamping screws 35*a*, 35*b*, is able to clamp around a zone of an element of the top fastener of the secondary path, as shown for example in FIG. 7.

Examples of Tests of Loading

Figure 8:
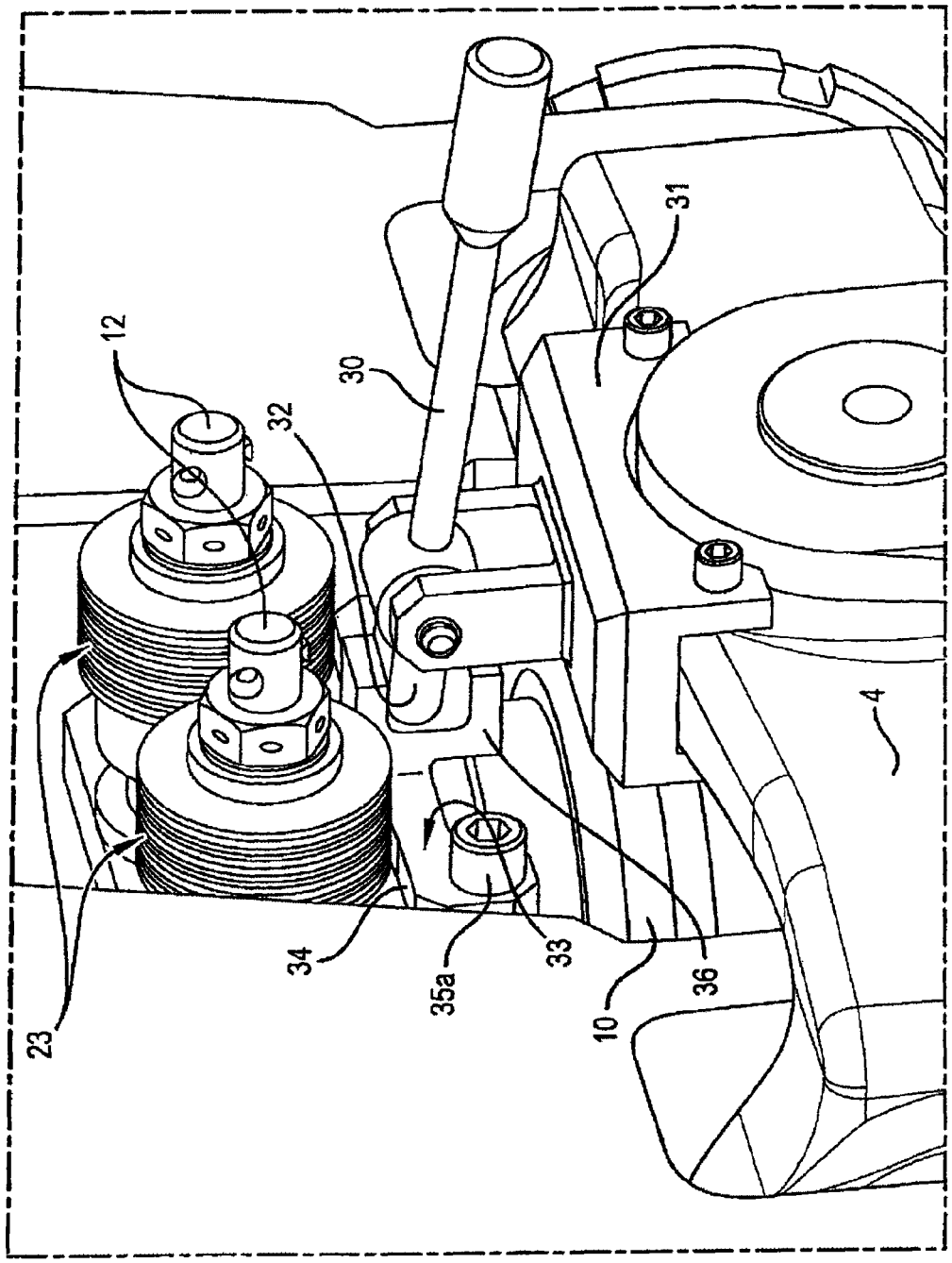
FIGS. 8 and 9 are representations of the device of FIGS. 5, 6 and 7 respectively during a take-up of effort in compression and during a take-up of effort in traction.
Figure 9:
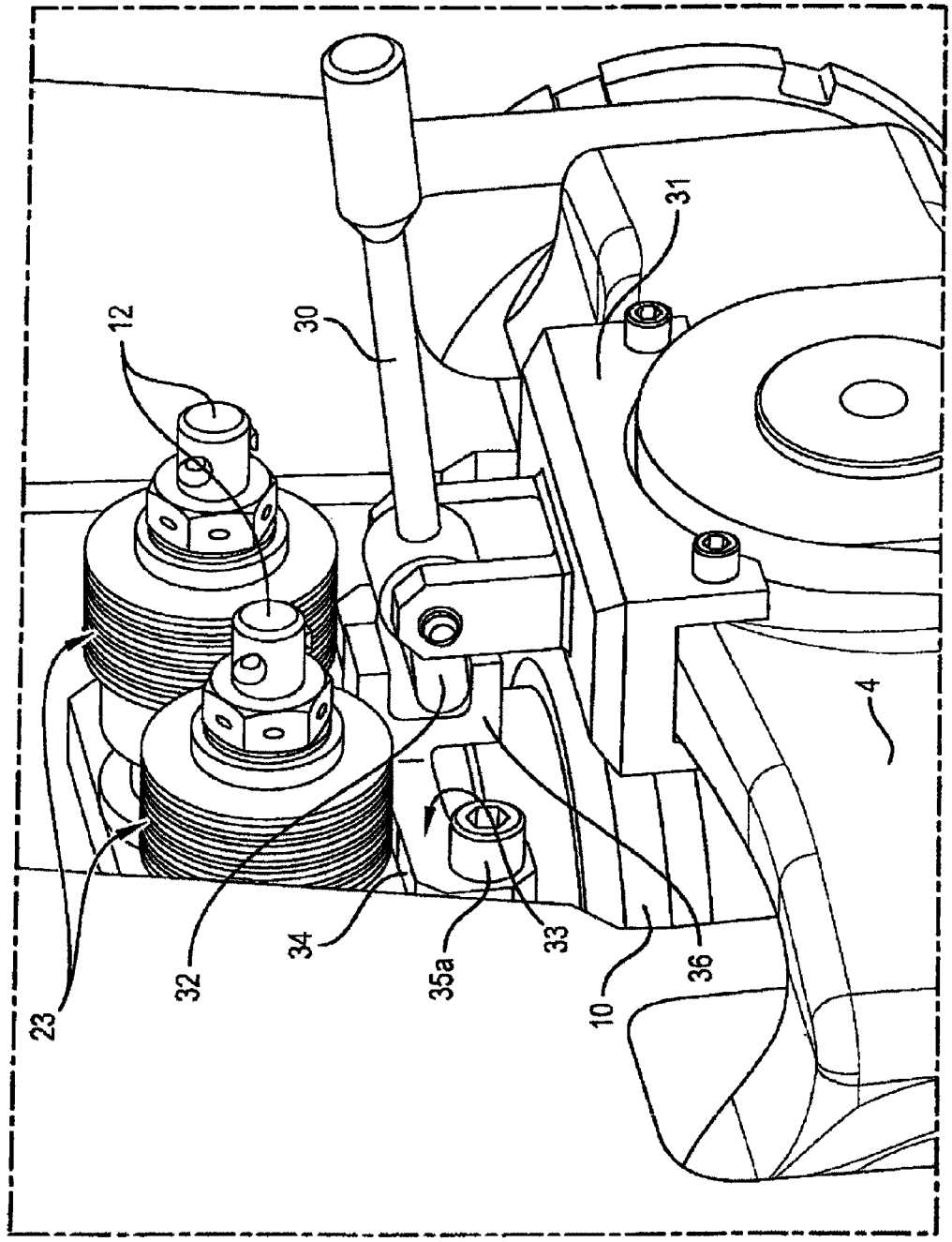

FIGS. 8 and 9 show a loading of the secondary path by the device for testing. Where applicable, in the structures using a spring box 23, the latter is loosened beforehand in order to prevent mechanical friction and allow for the resetting of the means for detecting effort on the secondary path. In the case of FIG. 8, the secondary path is solicited in compression.

The pivoting downwards of the lever arm 30 around its pivoting axis, tips the stop 32 pressing against the top inside flank of the U-shaped element 36. The pressing force is transmitted to the fastening piece 8, belonging to the top fastener of the secondary path, by the intermediary of the clamping tool 33. FIG. 9 shows an effort in the opposite direction.

During a loading by means of the device for testing which has just been described, it is verified that the means 20 for detecting effort on the secondary path did indeed detect the effort applied. This inspection can be carried out in several ways, by using or not using specifically-dedicated electronic means.

A first possibility is to position an operator in the cockpit of the aircraft, whose role is to check than an alarm, which is triggered when the means 20 for detecting have detected a loading of the secondary path, has indeed been triggered. Another possibility is to use a detector that is connected to a computer of the airplane in communication with the means 20 of detecting. Once the tests in traction and/or compression are complete, the device for testing is removed from the aircraft by unscrewing the clamping screws 35a, 35b and by removing the clamping vice 31. At the end of the test, the spring boxes 23 and the nuts 13 are put back in place.

The invention claimed is:

1. A testing device for testing means of detecting loading of a secondary path of a flight control actuator,
   the flight control actuator comprising a primary path and a secondary path able to take up the effort of the primary path in the event of a breakdown of the latter, the testing device comprising:
   a tool operably pressing against at least one zone of at least one element of the secondary path,
   and a lever arm which by tilting allows the tool to press against the zone so that it exerts at least one of a fraction and compression force on the secondary path,
   the lever arm being mounted pivotingly on a support operably fastened on a structure that is mechanically independent of the secondary path.

2. The device according to claim 1, wherein the tool operably clamps at least one zone of at least one element of the a top fastener of the secondary path.

3. The device according to claim 2, wherein the tool comprises a set including two plates connected by two clamping screws, operably clamping around an area of an element of the top fastener of the secondary path.

4. The device according to claim 3, wherein the tool has a U-shaped element wherein a stop is received, the stop terminating the arm forming a lever at its end opposite its grasping end, the stop pressing against at least one of the two inside flanks of the U-shaped element during the tipping of the lever arm in at least one direction, and making it possible to apply a force in at least one direction on the secondary path.

5. The device according to claim 4, wherein the support comprises a vice operably placed on a piece of one of the primary path and the structure of an aircraft.

6. The device according to claim 3, wherein the support comprises a vice operably placed on a piece of one of the primary path and the structure of an aircraft.

7. The device according to claim 2, wherein the tool has a U-shaped element wherein a stop is received, the stop terminating the arm forming a lever at its end opposite its grasping end, the stop pressing against at least one of the two inside flanks of the U-shaped element during the tipping of the lever arm in at least one direction, and making it possible to apply a force in at least one direction on the secondary path.

8. The device according to claim 7, wherein the support comprises a vice operably placed on a piece of one of the primary path and the structure of an aircraft.

9. The device according to claim 2, wherein the support comprises a vice operably placed on a piece of one of the primary path and the structure of an aircraft.

10. The device according to claim 1, wherein the tool has a U-shaped element wherein a stop is received, the stop terminating the arm forming a lever at its end opposite its grasping end, the stop pressing against at least one of the two inside flanks of the U-shaped element during the tipping of the lever arm in at least one direction, and making it possible to apply a force in at least one direction on the secondary path.

11. The device according to claim 10, wherein the support comprises a vice operably placed on a piece of one of the primary path and the structure of an aircraft.

12. The device according to claim 1, wherein the support comprises a vice operably placed on a piece of one of the primary path and the structure of an aircraft.

13. A testing method for testing a detector which operably detects loading of a secondary path of a flight control actuator, the flight control actuator comprising a primary path and a secondary path operably taking up the effort of the primary path in the event of a breakdown of the latter, the method further comprising:
    exerting at least one of a traction and compression force on the secondary path by a tool to press against at least one zone of at least one element of the secondary path, as well as by a lever arm which by tilting allows the tool to press against the zone in order that it exerts the at least one of the traction and compression force on the secondary path,
    pivoting the lever arm on a support operably fastened on a structure that is mechanically independent of the secondary path.

14. The method according to claim 13, further comprising: fastening the support of the lever arm on a structure that is mechanically independent of the secondary path, and fastening the tool around a zone of an element of the top fastener of the secondary path, and clamping around the zone with the tool.

15. The method according to claim 14, further comprising:
    a prior step of loosening a spring box and a nut, in order to prevent mechanical friction for allowing reset of the detector of the loading of the secondary path, and a step of retightening the spring box and the nut at the end of the test.

16. The method according to claim 13, further comprising a prior step of loosening a spring box and a nut, in order to prevent mechanical friction for allowing reset of the detector of the loading of the secondary path, and a step of retightening the spring box and the nut at the end of the test.

17. An apparatus comprising:
    (a) a detector operably detecting a loading of a secondary path of a flight control actuator, the flight control actuator comprising a primary path and the secondary path acting as a backup to the primary path;
    (b) a tester operably testing the detector, the tester further comprising:
    a member operably pressing against at least one portion of the secondary path;
    an arm causing the member to apply a force in at least one direction against the portion when the arm is moved; and
    a removable support mechanically independent from the secondary path, the arm being movably mounted to the support.

18. The device according to claim 17, wherein the portion operably clamps at least one zone of at least one element of a top fastener of the secondary path.

19. The device according to claim 17, wherein the tester has a U-shaped element wherein a stop is received, the stop terminating the arm at its end opposite its grasping end, the stop pressing against at least one of the two inside flanks of the U-shaped element during the tipping of the arm in at least one direction, and making it possible to apply a force in at least one direction on the secondary path.

20. The device according to claim 17, wherein the removable support comprises a vice operably placed on a piece of one of the primary path and the structure of an aircraft.

* * * * *